United States Patent
Cross et al.

(10) Patent No.: US 12,066,046 B2
(45) Date of Patent: Aug. 20, 2024

(54) BLIND FASTENERS

(71) Applicant: AIRBUS OPERATIONS LIMITED, Bristol (GB)

(72) Inventors: Matthew Cross, Bristol (GB); Andrew John Fay, Bristol (GB); Matthew Webster, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 460 days.

(21) Appl. No.: 17/412,723

(22) Filed: Aug. 26, 2021

(65) Prior Publication Data

US 2022/0128079 A1 Apr. 28, 2022

(30) Foreign Application Priority Data

Oct. 27, 2020 (GB) ..................................... 2016998

(51) Int. Cl.
*F16B 5/02* (2006.01)
*B64D 37/32* (2006.01)
*B64D 45/02* (2006.01)
*F16B 5/04* (2006.01)
*F16B 29/00* (2006.01)
*F16B 33/00* (2006.01)

(52) U.S. Cl.
CPC .............. *F16B 29/00* (2013.01); *B64D 37/32* (2013.01); *B64D 45/02* (2013.01); *F16B 5/0258* (2013.01); *F16B 5/04* (2013.01); *F16B 33/004* (2013.01); *F16B 2200/93* (2023.08)

(58) Field of Classification Search
CPC ...... F16B 2200/93; F16B 5/0258; F16B 5/04; F16B 19/1072; F16B 19/008; F16B 13/061; F16B 33/004; F16B 29/00; B64D 45/02

See application file for complete search history.

(56) References Cited

U.S. PATENT DOCUMENTS

| 4,579,491 | A |   | 4/1986 | Kull |
| 5,175,665 | A | * | 12/1992 | Pegg ..................... F16B 33/004 411/542 |
| 5,461,534 | A | * | 10/1995 | Gondot .................. B64D 45/02 174/2 |
| 5,498,110 | A | * | 3/1996 | Stencel ............... F16B 19/1063 411/34 |

(Continued)

OTHER PUBLICATIONS

Extended European Search Report for Application No. GB 21192896. 5, four pages, dated Feb. 14, 2022.
Search Report for GB2016998.3 dated Feb. 5, 2021, 4 pages.

*Primary Examiner* — Michael P Ferguson
(74) *Attorney, Agent, or Firm* — Nixon & Vanderhye P.C.

(57) ABSTRACT

A blind fastener is disclosed having a bolt part, a sleeve part, and a tubular insulating sheath. The bolt part is at least partially received within the sleeve part. A first end of the sheath is retained on the bolt part such that relative axial movement between the first end of the sheath and the bolt part is substantially prevented. The blind fastener is movable between: a pre-installation configuration in which the sleeve part has a first axial position relative to the bolt part and a predetermined section of the sheath is adjacent an outer surface of the sleeve part; and a post-installation configuration in which the sleeve part has a second, different axial position relative to the bolt part and the predetermined section of the sheath is adjacent an inner surface of the sleeve part.

15 Claims, 2 Drawing Sheets

(56) References Cited

U.S. PATENT DOCUMENTS

| | | | |
|---|---|---|---|
| 8,961,086 B2* | 2/2015 | Pratt | F16B 19/1072 411/1 |
| 2011/0123289 A1* | 5/2011 | Pratt | F16B 19/1063 29/505 |
| 2014/0186133 A1 | 7/2014 | Dehlke | |
| 2019/0048913 A1* | 2/2019 | Rosenberg | F16B 19/1072 |

* cited by examiner

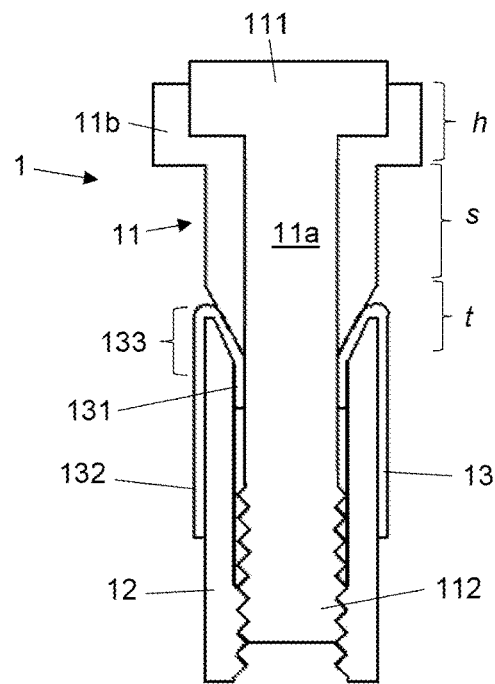
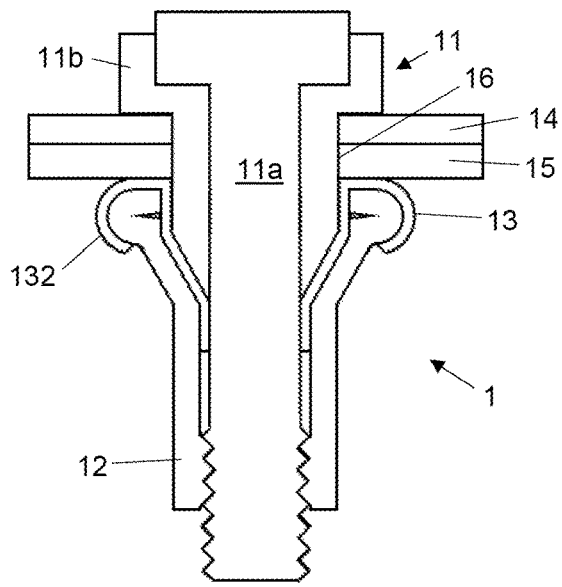
Fig. 1a　　　　　　　Fig. 1b
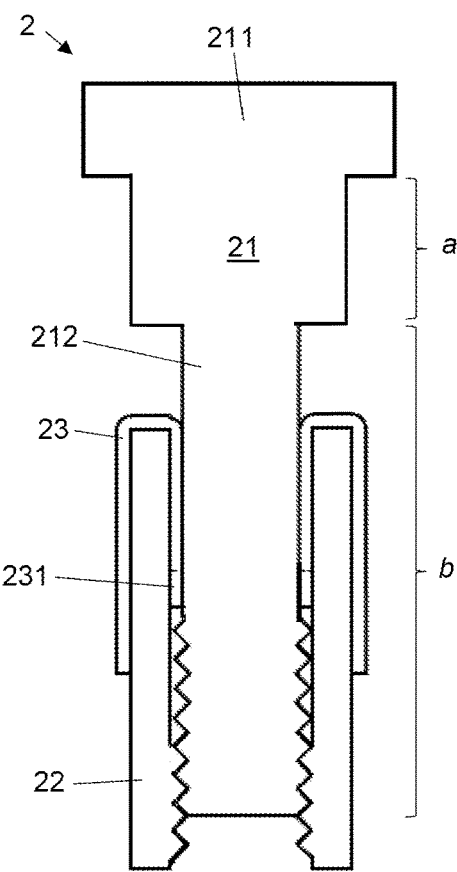
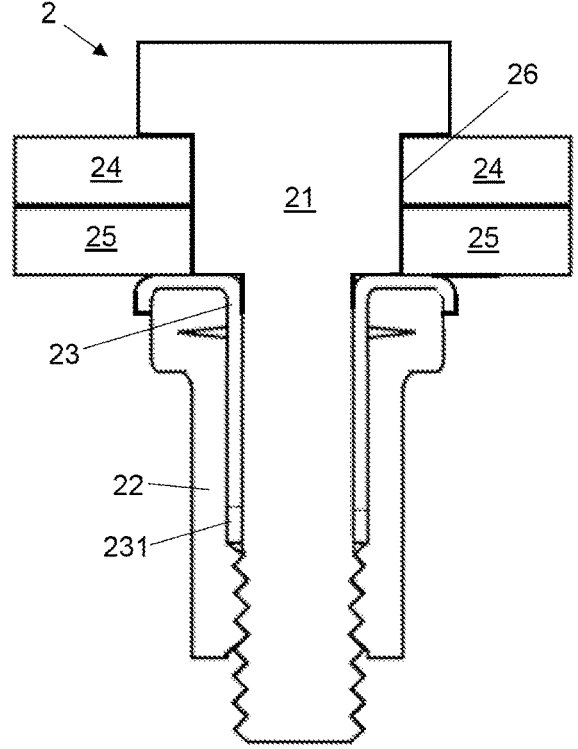
Fig. 2a　　　　　　　Fig. 2b

BLIND FASTENERS

CROSS RELATED APPLICATION

This application claims priority to United Kingdom Patent Application GB 2016998.3, filed Oct. 27, 2020, the entire content of which is hereby incorporated by reference.

TECHNICAL FIELD

The present invention relates to blind fasteners, to fuel tanks fastened together by such blind fasteners, and to aircraft comprising such fuel tanks and/or blind fasteners.

BACKGROUND

There is an increasing trend towards manufacturing aircraft structures from composite materials. In an aircraft, composite structures are typically fastened to each other and/or to metal structures using metal fasteners. Composite materials used for aerostructures are typically much less conductive than metal, at least under the normal operating conditions of an aircraft. Electric charge which travels on and in a composite structure may arc from the composite structure to an adjacent metal fastener or structure if the current density exceeds the current carrying ability of the joint between the composite structure and the metal fastener/structure.

When lightning strikes such an aircraft, a large charge is placed on the composite structure. When the charge arcs from the composite structure to a metal fastener or structure, a very large amount of energy is expended over a short period of time. The air around the arc is heated up by this energy, as is the composite structure. The heating of the composite structure may be sufficient to instantaneously vaporize small particles of the composite material. Alternatively or additionally, particles of the composite material and/or the metal fastener may become glowing hot and break off. The energy of the lightning strike is often sufficient to eject these particles, in the form of sparks, to a metre or more from the arcing location.

If such arcing were to occur in a fuel tank, there would be a risk that the sparks could ignite the fuel or any fuel vapors. Aircraft in which the fuel tanks are at least partially formed by composite structures must therefore include mechanisms for preventing ignition of fuel in the event of a lightning strike.

SUMMARY

A first aspect of the present invention provides a blind fastener. The blind fastener comprises a bolt part, a sleeve part, and a tubular insulating sheath. The bolt part is at least partially received within the sleeve part. A first end of the sheath is retained on the bolt part such that relative axial movement between the first end of the sheath and the bolt part is substantially prevented. The blind fastener is movable between: a pre-installation configuration in which the sleeve part has a first axial position relative to the bolt part and a predetermined section of the sheath is adjacent an outer surface of the sleeve part; and a post-installation configuration in which the sleeve part has a second, different axial position relative to the bolt part and the predetermined section of the sheath is adjacent an inner surface of the sleeve part.

Optionally, the sheath is elastically deformable.
Optionally, the sheath is plastically deformable.
Optionally, the sleeve part is undeformed in the pre-installation configuration and is deformed in the post-installation configuration.

Optionally, the sleeve part has a first axial position relative to the bolt part in the pre-installation configuration and a second, different, axial position relative to the bolt part in the post-installation configuration.

Optionally, in the post-installation configuration at least part of the sheath is sandwiched between the bolt part and the sleeve part.

Optionally, in the pre-installation configuration the part of the sheath which is adjacent the outer surface of the sleeve part has a greater length than the part of the sheath which is adjacent the inner surface of the sleeve part, and in the post-installation configuration the part of the sheath which is adjacent the outer surface of the sleeve part has a smaller length than the part of the sheath which is adjacent the inner surface of the sleeve part.

Optionally, in the post-installation configuration a second end part of the sheath distal from the first end is sandwiched between the sleeve part and a structure on which the blind fastener has been installed such that direct contact between the sleeve part and the structure is prevented by the sheath.

Optionally, the bolt part comprises two or more separate components.

Optionally, the first end of the sheath is retained on the bolt part by mechanical entrapment of the sheath between the bolt part and the sleeve part.

Optionally, the first end of the sheath is bonded to the bolt part.

A second aspect of the invention provides a fuel tank comprising a first structure and a second structure fastened together by a blind fastener according to the first aspect, wherein the sleeve part of the blind fastener is disposed within a fuel-containing space of the fuel tank.

Optionally, the fuel tank is an aircraft fuel tank.

A third aspect of the invention provides an aircraft comprising a blind fastener according to the first aspect or a fuel tank according to the second aspect.

BRIEF DESCRIPTION OF THE DRAWINGS

Embodiments of the invention will now be described, by way of example only, with reference to the accompanying drawings, in which:

FIG. 1a is a cross-section through a first example blind fastener according to the invention in a pre-installation configuration;

FIG. 1b is a cross-section through the blind fastener of FIG. 1a in a post-installation configuration;

FIG. 2a is a cross-section through a second example blind fastener according to the invention in a pre-installation configuration;

FIG. 2b is a cross-section through the blind fastener of FIG. 2a in a post-installation configuration;

DETAILED DESCRIPTION

Figure 3:
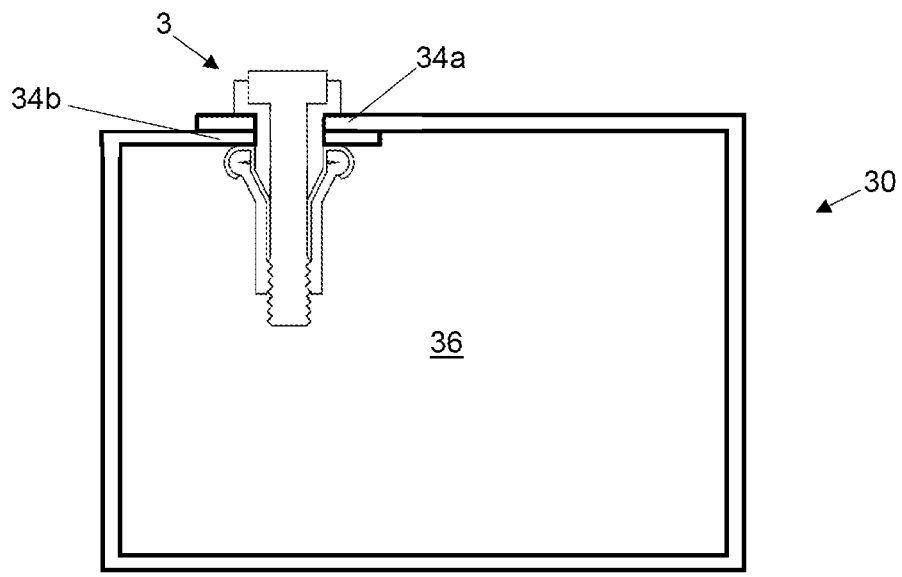
FIG. 3 is a cross-section through an example fuel tank according to the invention.

The examples of the invention described in the following discussion relate to blind fasteners. Each blind fastener according to the invention has a bolt part, a sleeve part and a tubular insulating sheath. The bolt part is at least partially received within the sleeve part. A first end of the sheath is retained on the bolt part such that relative axial movement between the first end of the sheath and the bolt part is substantially prevented. Each blind fastener is moveable between a pre-installation configuration in which the sleeve part has a first axial position relative to the bolt part and a predetermined section of the sheath is adjacent an outer surface of the sleeve part, and a post-installation configuration in which the sleeve part has a second, different axial position relative to the bolt part and the predetermined section of the sheath is adjacent an inner surface of the sleeve part.

Sparking between a fastener and a structure on which it is installed typically happens under the nut (or the formed tail, in the case of a blind fastener). Conventionally, such sparking is prevented by insulating the fastener-structure interface by applying a coating of paint or another insulating material to the structure. However, it has been found that such coatings frequently become damaged during the process of installing a fastener, requiring every fastener location in a fuel vapour zone on an aircraft to be inspected after fastener installation. Such inspection is time consuming, and generally will not be possible in applications where blind fasteners have been used (typically because a back side of the structure the fastener is being installed onto is not accessible, either for manipulating a nut or for inspecting the fastener tail and surrounding structure). Blind fasteners according to the invention advantageously provide a solution for reliably ensuring that an intact insulating barrier is present between the formed tail of the fastener and the structure after the fastener has been installed, so that sparking is prevented.

In particular, in the post-installation configuration of an example fastener according to the invention, the insulating sheath completely covers the region of the sleeve part of the fastener that would otherwise be in contact with the structure onto which that fastener has been installed. Contact between the sleeve part and the structure is thereby prevented, which prevents sparking between the tail of the fastener and the structure in the event of a lightning strike. The sheath is sufficiently robust that its integrity is guaranteed to be maintained during the process of installing the fastener, eliminating the need to inspect the tail end of the fastener. Furthermore, the requirement to apply an insulating coating to the structure is eliminated. Advantageously, the configuration of the fasteners according to the invention is such that the sheath moves into the required position as a consequence of the normal installation process of the fastener, so no additional operations are needed during an assembly process.

FIGS. 1a and 1b are cross-sections through an example blind fastener 1 according to the invention. The blind fastener 1 is moveable between a pre-installation configuration (shown in FIG. 1a) and a post-installation configuration (shown in FIG. 1b). Examples of existing blind fasteners to which a sheath can be secured to form a blind fastener according to the present invention include the OSI-Bolt® manufactured by Monogram Aerospace Fasteners; Composi-Lok® manufactured by Monogram Aerospace Fasteners; Radial-Lok® manufactured by Monogram Aerospace Fasteners; Ergotech® manufactured by Arconic; and Optiblind™ manufactured by Lisi Aerospace.

In FIG. 1b the fastener 1 is installed on a workpiece comprising a first structure 14 and a second structure 15. The first and second structures 14, 15 are held together by the fastener 1. The first and second structures 14, 15 may both be formed from a composite material, or they may both be formed from a metallic material, or it may be the case that one of the first and second structures 14, 15 is formed from a composite material and the other of the first and second structures 14, 15 is formed from a metallic material. In some examples the first and second structures 14, 15 are aircraft structures. For example, the first structure 14 may be a wing cover panel and the second structure 15 may be a spar.

The fastener 1 comprises a bolt part 11, a sleeve part 12, and a tubular insulating sheath 13. The sheath 13 is disposed around the bolt part 11. The bolt part 11 is at least partially received within the sleeve part 12. The bolt part 11 has a head end 111, on which a head is formed. The head has a larger diameter than the rest of the bolt part 11. The end of the bolt part 11 opposite to the head end is referred to as the tail end 112. The sleeve part 12 may also be considered to have a head end (that is, the end of the sleeve part nearest the head of the bolt part 11) and a tail end (that is, the end of the sleeve part nearest the tail end of the bolt part 11). The bolt part 11 and sleeve part 12 may be formed from any suitable material having material properties suitable to withstand the operational loads expected to be experienced by the fastener 1. The material of the sleeve part 12 must also be able to deform during installation of the fastener 1 in the manner described below.

The bolt part 11 comprises two separate components, namely an inner bolt part 11a and an outer bolt part 11b. The inner bolt part 11a has a stem with a substantially constant diameter, and a head. The outer bolt part 11b is hollow and surrounds the head end of the inner bolt part 11a. The outer bolt part 11b comprises a head section h, which sits around the head of the inner bolt part 11a, a tapered section t at the opposite end to the head section, and a stem section s between the tapered section t and the head section h. The outer bolt part 11a has an axial length significantly less than the axial length of the inner bolt part 11b. In some examples the outer bolt part 11b may extend for less than half of the axial length of the inner bolt part 11a. The length of the outer bolt part 11b may be selected in dependence on the thickness of a workpiece on which the fastener 1 is to be installed. For example, the axial length of the stem section h may be greater than the thickness of the workpiece by a preselected amount.

The effect of the tapered section t is that the diameter of the bolt part 11 progressively increases from the diameter of the inner bolt part 11a to the diameter of the outer bolt part 11b, over the axial length of the tapered section t. This configuration confers several advantages, as will be explained later.

The diameter of the stem section s is greater than or equal to the diameter of the sleeve part 12, and is less than or equal to the diameter of a fastener hole into which it is intended to install the fastener 1. The diameter of the sleeve part 12 may be less than the diameter of the stem section s, in order that the sleeve part 12 can easily be inserted into the fastener hole even with the sheath 13 disposed on the outer surface of the sleeve part 12 as shown in FIG. 1a. However, it is advantageous for the diameter of the stem section s to be equal to the diameter of the fastener hole so that close contact between the hole wall and the outer surface of the stem section is achieved after installation. This close contact can prevent sparking between the fastener 1 and the hole wall.

Such sparking may occur as a result of "edge glow" effects, which may be experienced by composite materials when such materials are struck by lightning. The example fastener 1 may therefore be particularly advantageous for applications in which at least one of the structures 14, 15 comprises a composite material. It will be appreciated that the configuration of the outer bolt part 11 facilitates achieving close contact between the fastener 1 and the hole wall whilst also facilitating easy insertion of the fastener 1 into the fastener hole.

In the pre-installation configuration, the sleeve part 12 has a first axial position relative to the bolt part 11. In particular, the sleeve part 12 is relatively further (as compared to the post-installation configuration) from the head end of the bolt part 11. In the post-installation configuration, the sleeve part 12 has a second, different axial position relative to the bolt part 11. In particular, the sleeve part 12 is relatively closer to the head end of the bolt part 11. Furthermore, in the post-installation configuration the shape of the sleeve part 12 is deformed relative to its shape in the pre-installation configuration. The sleeve part 12 is configured to deform into the deformed shape shown in FIG. 1*b* in response to being axially urged over the tail end of the outer bolt part 11*b* and against the second structure 15. The tapered section t of the outer bolt part 11*b* facilitates sliding of the sleeve part 12 over the outer bolt part 11*b* as the sleeve part 12 moves axially toward the head end of the fastener 1 during an installation process. The head end of the sleeve part 12 is forced to expand radially by the tapered section t during this axial movement. This expansion may facilitate deformation of the sleeve part 12 into the post-installation deformed shape shown in FIG. 1*b*. In the post-installation configuration of the fastener 1 the head end of the sleeve part is expanded (that is, its diameter is increased) where it overlaps the outer bolt part 11*b*.

The deformed shape of the sleeve part 12 has a greater maximum diameter than the undeformed shape. In the illustrated example the maximum diameter of the deformed shape of the sleeve part 12 is slightly greater than the diameter of the head end of the outer bolt part 11*b*. The diameter of the head end of the outer bolt part 11*b* and the maximum diameter of the deformed shape of the sleeve part 12 are each larger than the diameter of a fastener hole 16 which extends through the first and second structures 14, 15 and into which the fastener 1 is installed. The diameter of the undeformed shape of the sleeve part 12 is less than or equal to the diameter of the fastener hole 16. The diameter of the undeformed shape of the sleeve part 12 may advantageously be slightly less than the diameter of the fastener hole 16, to enable the sleeve part 12 and sheath 13 to easily be inserted into the fastener hole 16. To facilitate the deforming of the sleeve part 12, the sleeve part 12 may comprise one or more relatively weak regions or other structural features which are configured to buckle in a controlled manner under the influence of an axial urging force applied during installation of the fastener 1.

In the illustrated example, a screw thread is present on the circumferential surface of the inner bolt part 11*a* at and/or near the tail end 112. The screw thread on the inner bolt part 11*a* is engaged with a corresponding screw thread provided on the inner surface of the tail end of the sleeve part 12. The function of the threaded engagement between the inner bolt part 11*a* and the sleeve part 12 is to drive relative axial movement of the bolt part 11 and sleeve part 12 in response to relative rotational movement of the inner bolt part 11*a* and sleeve part 12. The connection between the outer bolt part 11*b* and the inner bolt part 11*a* is such that the outer bolt part 11*b* is substantially prevented from moving relative to the inner bolt part 11*a*, and so the inner and outer bolt parts 11*a*, 11*b* can be considered as a unitary bolt part 11 for the purposes of understanding the installation process.

It should be noted that other blind fasteners according to the invention may not comprise a threaded engagement between the bolt part and the sleeve part, and instead some other mechanism of driving relative axial movement of the bolt part and sleeve part may be provided. For example, the bolt part 11 may be configured to be pulled upwardly by an externally applied pulling force during installation of the fastener 1, whilst the sleeve part 12 is held stationary. In other examples, the relative axial movement may be driven in some other way, for instance by rotating or pulling the sleeve part 12.

During a process of installing the fastener 1, the sleeve part 12 is substantially prevented, in any suitable manner, from rotating relative to the structures 14, 15 whilst the bolt part 11 is rotated (e.g. using an installation tool such as a wrench) relative to the structures 14, 15 and relative to the sleeve part 12. The direction of rotation of the bolt part 11 is selected in dependence on the configuration of the screw thread. Assuming a standard screw thread, the bolt part 11 is rotated clockwise when installing the fastener 1. This relative rotation of the bolt part 11 and sleeve part 12 drives relative axial movement of the sleeve part 12 and bolt part 11 in a direction such that the sleeve part 12 is urged against the second structure 15. The screw threads and bolt head are configured such that enough torque can be applied to generate an axial force that is sufficient to deform the sleeve part 12 into its deformed shape.

The insulating sheath 13 has a first end 131, which may be referred to as a fixed end, and a second end 132, opposite the first end 131, which may be referred to as a free end. The free end 132 of the sheath is free to move relative to the sleeve part 12. The fixed end 131 of the sheath 13 is retained on the bolt part 11 such that relative axial movement between the first end 131 of the sheath and the bolt part 11 is substantially prevented. Any suitable retention mechanism may be used to retain the fixed end 131 of the sheath on the bolt part 11. In the illustrated example, the fixed end of the sheath 13 is retained on the inner bolt part 11 by mechanical entrapment of the sheath between the sleeve part 12 and the outer bolt part 11*b*. No additional attachment mechanism is required to prevent relative axial movement of the sheath 13 and the bolt part 11. This is achieved because a component of an upwards (with respect to the orientation shown in FIGS. 1*a* and 1*b*) axial force exerted by the sleeve part 12 on the portion of the sheath 13 which lies adjacent the tapered section t is normal to the surface of the tapered section t, and thus acts to press the sheath 13 against this surface.

To retain the fixed end of the sheath 13 on the bolt part 11 prior to installation of the fastener 1, when the fastener 1 is in the pre-installation configuration and no upwards axial force is being exerted on the sheath 13, the fastener 1 is configured such that the fixed end of the sheath 13 is tightly sandwiched between the sleeve part 12 and the inner bolt part 11*a*, and/or is tightly sandwiched between the sleeve part 12 and the tapered section t of the outer bolt part 11*b*. To further facilitate the retention of the fixed end of the sheath 13 at a selected axial position on the bolt part 11, even during installation of the fastener 1, the surface of the sheath 13 which contacts the bolt part 11 and/or the surface of the bolt part 11 which contacts the sheath 13, may be configured such that the coefficient of friction between the contacting surfaces is relatively high (for example, as compared to a coefficient of friction between the contacting surfaces of the sheath 13 and the sleeve part 12).

Alternatively, the fixed end could be retained on the bolt part 11 by bonding, or by a different form of mechanical interlock. For example, mutually interlocking formations could be provided on the fixed end 131 of the sheath and on the outer surface of the bolt part 11. Suitable mechanisms for retaining the fixed end on the bolt part 11 include (but are not limited to) an interference fit, an adhesive bond, a snap-fit joint, a thermoplastic weld, a fastener or other mechanical means.

The sheath 13 is deformable, to enable it to accommodate the deformation of the sleeve part 12 which takes place during installation of the fastener 1. In some examples the sheath 13 is elastically deformable. In other examples the sheath 13 is plastically deformable. In some examples, the length of the sheath 13 may be greater in the post-installation configuration than in the pre-installation configuration, due to stretching of the sheath 13 during the installation process. The sheath 13 may be formed from any suitable electrically insulating material. For example, the sheath 13 may comprise a polymer material. The sheath 13 may comprise a reinforced polymer material. The sheath 13 may comprise a thermoplastic material. Suitable materials may include Nylon, acrylonitrile butadiene styrene (ABS), polyethylene, thermoplastic elastomer (TPE or TPE) or another polymer material, optionally fabric reinforced. The material of the sheath 13 is selected such that it is robust enough to maintain its structural integrity during installation of the fastener 1. Preferably the sheath is as thin as possible whilst being robust enough to maintain its structural integrity during installation of the fastener, and also whilst being able to provide sufficient electrical insulation to prevent sparking between the sleeve part 12 and the second structure 15 in the event of a lightning strike.

The sheath 13 is folded back on itself around the head end of the sleeve part 12. The amount by which the sheath 13 is folded back on itself differs between the pre-installation configuration and the post-installation configuration. In particular, the length (in the axial direction of the fastener 1) of the sheath 13 which is adjacent the outer surface of the sleeve part 12 is significantly greater in the pre-installation configuration than in the post-installation configuration. Consequently, the length of the sheath 13 which is adjacent the inner surface of the sleeve part 13 is less in the pre-installation configuration than in the post-installation configuration. A predetermined section 133 of the sheath 13 is adjacent an outer surface of the sleeve part 12 in the pre-installation configuration, and adjacent an inner surface of the sleeve part 12 in the post-installation configuration. The fact that the sheath 13 is folded back on itself by at least a small amount in the post-installation configuration is advantageous because it ensures that the sleeve part 12 cannot contact the second structure 15, thereby ensuring that sparking will not occur between the sleeve part 12 and the second structure 15.

During installation of the fastener 1, the surface of the sheath 13 that is in contact with the sleeve part 12 slides relative to the surfaces of the sleeve part 12 with which it is in contact. In the illustrated example, the sliding is both axial and rotational. In other examples (e.g. examples in which the sleeve part 12 is not threadingly engaged with the bolt part 11) the sliding may only be axial. As described above, the bolt part 11 is rotated during a process of installing the fastener 1, whilst the sleeve part 12 is maintained substantially stationary. Since the fixed end 131 of the sheath 13 is fixedly attached to the bolt part 11, the sheath 13 rotates together with the bolt part 11. Also as described above, the rotation of the bolt part 11 causes the sleeve part 12 to move axially relative to the bolt part 11, toward the head end of the bolt part 11. Since the fixed end of the sheath 13 is fixedly attached to the bolt part 11, there is relative axial movement between the sheath 13 and the sleeve part 12. Consequently, the length of the sheath 13 which is disposed between the sleeve part 12 and the bolt part 11 increases, whilst the length of the sheath 13 which is disposed on the outer surface of the sleeve part 12 decreases. To facilitate the relative sliding between the sheath 13 and the sleeve part 12, the surface of the sheath 13 which contacts the sleeve part and/or the surfaces of the sleeve part 12 which contact the sheath 13 may be configured such that there is a low coefficient of friction between the contacting surfaces. For example, one or both of the sleeve part 12 and the sheath 13 may comprise a low-friction coating.

Alternative blind fastener designs according to the invention (not illustrated) are also envisaged, in which the bolt part is unitary, but has substantially the same shape as the combined inner bolt part 11*a* and outer bolt part 11*b* of the fastener 1. Such alternative fasteners are installed in the same manner as the example fastener 1 and provide substantially the same advantages as the example fastener 1.

FIGS. 2*a* and 2*b* are cross-sections through a second example blind fastener 2 according to the invention. FIG. 2*a* shows the fastener 2 in a pre-installation configuration and FIG. 2*b* shows the fastener 2 in a post-installation configuration. In FIG. 2*b* the fastener 2 is shown installed on a workpiece comprising a first structure 24 and a second structure 25, which have substantially the same features as the first and second structures 14, 15 of FIG. 1*b*. The fastener 2 is installed according to substantially the same installation process as the example fastener 1. However; the structure of the fastener 2 differs in certain key respects from the example blind fastener 1 of FIG. 1. The fastener 2 comprises a bolt part 21, a sleeve part 22, and a sheath 23, which are substantially the same as the corresponding components of the example fastener 1, except for the differences explicitly described below.

The bolt part 21 is a single unitary component, rather than comprising an inner bolt part and an outer bolt part. Furthermore, the shape of the bolt part 21 is different to the overall shape of the bolt part 11. The bolt part 21 has a head 211, which is substantially the same as the head 111 of the bolt 11, and a stem 212 extending from the heat 211. The stem 212 has a first part a, adjacent the head 211, which has a relatively larger diameter. A second part b forms the remainder of the stem 212 and has a relatively smaller diameter. The diameter of the second part b is smaller than the diameter of the first part a by at least the thickness of the sleeve 22. The diameter of the second part b may be smaller than the diameter of the first part a by the combined thickness of the sleeve 22 and sheath 23, when the fastener 1 is in the pre-installation configuration shown in FIG. 2*a*.

The axial length of the first part a is equal to the thickness of the workpiece formed by the first and second structures 24, 25. The diameter of the first part a is greater than or equal to the diameter of the sleeve part 22, and is less than or equal to the diameter of the fastener hole 26 into which it is intended to install the fastener 2. The diameter of the sleeve part 22 may be less than the diameter of the first part a, in order that the sleeve part 22 can easily be inserted into the fastener hole even with the sheath 23 disposed on the outer surface of the sleeve part 22. As with the example fastener 1, in this example it is advantageous for the diameter of the first part a to be equal to the diameter of the fastener hole so that close contact between the hole wall and the outer surface of the first part a is achieved after installation, in order to prevent sparking between the fastener 2 and the hole wall.

The fixed end 231 of the sheath 23 is bonded to the second part b of the stem 212, using any suitable bonding agent.

Installation of the example fastener 2 on the workpiece, and the deformation of the sleeve 23 into the post-installation configuration shown in FIG. 2b which occurs during installation, is substantially the same for the fastener 2 as for the fastener 1. The only significant difference is that the stem 212 does not comprise a tapered section over which the sleeve 23 must expand. Instead, deformation of the sleeve 23 is entirely caused by buckling of the sleeve 23 which occurs when the sleeve 23 is axially urged against the step between the first and second parts a, b of the stem 212. The post-installation configuration of the fastener 2 is substantially similar to the post-installation configuration of the fastener 1 shown in FIG. 1a, except that the head end of the sleeve part 23 is not expanded.

FIG. 3 is a cross-section through a fuel tank 30. The fuel tank 30 comprises a first structure 34a and a second structure 34b, which are fastened together by a blind fastener 3 according to the invention. The fuel tank 30 is shown schematically, and not to scale. In particular, the fastener 3 is shown being significantly larger in relation to the rest of the fuel tank than would likely be the case in a real-world application, for ease of depiction.

The illustrated blind fastener 3 is of the same design as the example fastener 1 of FIGS. 1a-b, although it could be any blind fastener according to the invention. The first structure 34a is a first end of a unitary fuel tank wall component, and the second structure 34b is a second end of that unitary fuel tank wall component. However, other examples are possible in which the first and second structures 34a, 34b are comprised in separate components. The first and second structures 34a, 34b may have any of the features of the example first and second structures 14, 15, 24, 25 described above. The fuel tank wall component is configured such that, when the first and second structures 34a, 34b are fastened together, it defines an enclosed space 36 suitable for the storage of fuel. The enclosed space 36 may be referred to as a fuel-containing space (even though in some operational states of the fuel tank no fuel may actually be contained therein). In some examples the first and second structures 34a, 34b may be fastened together by a plurality of blind fasteners 3 according to the invention. In some examples the fuel tank 30 is an aircraft fuel tank.

Figure 4:
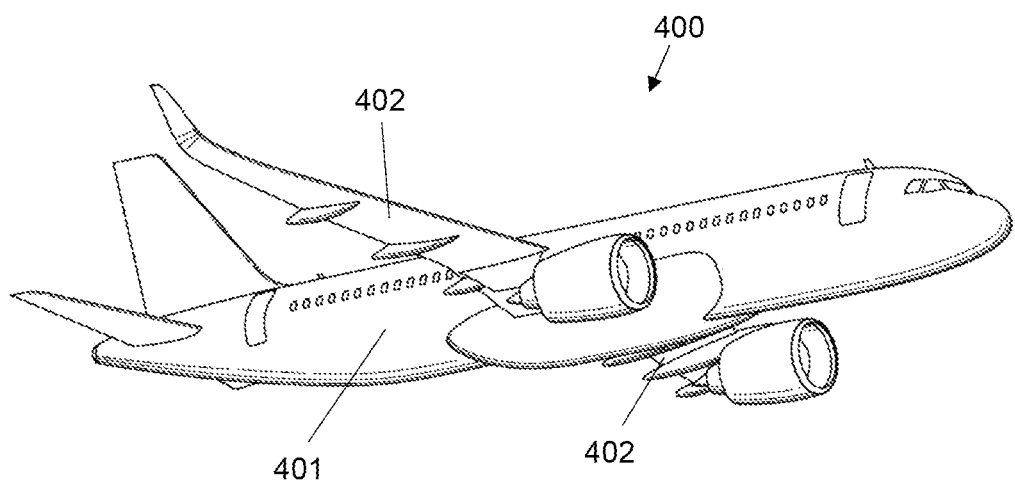
FIG. 4 is a perspective view of an example aircraft according to the invention.

FIG. 4 shows an example aircraft 400 comprising a blind fastener (not visible) according to the invention. The aircraft 400 has a pair of wings 402 attached to a fuselage 401. Each wing 402 comprises a structural wing box formed by a front spar, a rear spar, an upper cover panel and a lower cover panel. Any two or more of the wing box components may be integrally formed. At least some of the joints between wing box components may comprise one or more blind fasteners according to the invention. Each wing box at least partially defines a fuel-containing space, and may therefore have any of the features of the example fuel tank 30 of FIG. 3. Where a joint between wing box components forms part of a wall of a fuel-containing space, any fasteners comprised in that joint which extend into the fuel-containing space may advantageously be blind fasteners according to the invention (such as the example blind fastener 1 or the example blind fastener 2 described above). The aircraft 400 may additionally comprise one or more further fuel tanks. Any such further fuel tanks may comprise structures fastened together by one or more blind fasteners according to the invention. The illustrated aircraft is a commercial airliner, but the discussion above applies equally to any other type of aircraft, or indeed any other vehicle, which comprises a fuel-containing space defined by fastened-together structures.

Although the invention has been described above with reference to one or more preferred examples or embodiments, it will be appreciated that various changes or modifications may be made without departing from the scope of the invention as defined in the appended claims.

Although the invention has been described above mainly in the context of a fixed-wing aircraft application, it may also be advantageously applied to various other applications, including but not limited to applications on vehicles such as helicopters, drones, trains, automobiles and spacecraft.

Where the term "or" has been used in the preceding description, this term should be understood to mean "and/or", except where explicitly stated otherwise.

The invention claimed is:

1. A blind fastener comprising:
a bolt part having a shaft and a head;
a sleeve part having an outer cylindrical surface and an inner cylindrical surface, wherein the bolt part is at least partially received within the sleeve part;
a tubular insulating sheath, wherein a first end of the sheath is retained on the bolt part such that relative axial movement between the first end of the sheath and the bolt part is substantially prevented;
wherein the blind fastener is movable between:
a pre-installation configuration in which the sleeve part has a first axial position relative to the bolt part and a predetermined section of the sheath is adjacent the outer cylindrical surface of the sleeve part; and
a post-installation configuration in which the sleeve part has a second different axial position relative to the bolt part and the predetermined section of the sheath is adjacent the inner cylindrical surface of the sleeve part, and
wherein the sheath is folded back around an axial end surface of the sleeve part facing the head of the bolt part such that it forms a folded sheath portion wherein an outer tubular portion of the sheath engages the outer cylindrical surface of the sleeve part and an inner tubular portion of the sheath is disposed between the inner cylindrical surface of the sleeve part and the shaft of the bolt part,
wherein when the sleeve part is threaded onto the bolt part and axially displaced toward the head of the bolt part, the bolt part axially displaces the first fixed end of the sheath relative to the sleeve part toward an opposing axial end surface of the sleeve part such that the outer tubular portion of the sheath is longer in the pre-installation configuration than the post-installation configuration; and
wherein the folded sheath portion is configured to be sandwiched between the axial end surface of the sleeve part and a structure through which the bolt part extends and is clamped by the head of the bolt part.

2. A blind fastener according to claim 1, wherein the sheath is elastically deformable.

3. A blind fastener according to claim 1, wherein the sheath is plastically deformable.

4. A blind fastener according to claim 1, wherein the sleeve part is undeformed in the pre-installation configuration and is deformed in the post-installation configuration.

5. A blind fastener according to claim 1, wherein the sleeve part has a first axial position relative to the bolt part in the pre-installation configuration and a second, different, axial position relative to the bolt part in the post-installation configuration.

6. A blind fastener according to claim 1, wherein in the post-installation configuration, at least part of the sheath is sandwiched between the bolt part and the sleeve part.

7. A blind fastener according to claim 1, wherein the bolt part comprises two or more separate components.

8. A blind fastener according to claim 1, wherein the first end of the sheath is retained on the bolt part by mechanical entrapment of the sheath between the bolt part and the sleeve part.

9. A blind fastener according to claim 1, wherein the first end of the sheath is bonded to the bolt part.

10. A fuel tank comprising a first structure and a second structure fastened together by a blind fastener according to claim 1, wherein the sleeve part of the blind fastener is disposed within a fuel-containing space of the fuel tank.

11. A fuel tank according to claim 10, wherein the fuel tank is an aircraft fuel tank.

12. An aircraft comprising a fuel tank according to claim 10.

13. An aircraft comprising a blind fastener according to claim 1.

14. A blind fastener, comprising:
a bolt part having a shaft and a head;
a sleeve part having an outer cylindrical surface and an inner cylindrical surface, wherein the bolt part is at least partially received within the sleeve part;
a tubular insulating sheath, wherein a first end of the sheath is retained on the bolt part such that relative axial movement between the first end of the sheath and the bolt part is substantially prevented;
wherein the blind fastener is movable between:
a pre-installation configuration in which the sleeve part has a first axial position relative to the bolt part and a predetermined section of the sheath is adjacent the outer cylindrical surface of the sleeve part, and the part of the sheath which is adjacent the outer cylindrical surface of the sleeve part has a greater length than a part of the sheath which is adjacent the inner cylindrical surface of the sleeve part; and
a post-installation configuration in which the sleeve part has a second different axial position relative to the bolt part and the predetermined section of the sheath is adjacent the inner cylindrical surface of the sleeve part, and
wherein the sheath is folded back around an axial end surface of the sleeve part facing the head of the bolt part such that it forms a folded sheath portion wherein an outer tubular portion of the sheath engages the outer cylindrical surface of the sleeve part and an inner tubular portion of the sheath is disposed between the inner cylindrical surface of the sleeve part and the shaft of the bolt part,
wherein when the sleeve part is threaded onto the bolt part and axially displaced toward the head of the bolt part, the bolt part axially displaces the first fixed end of the sheath relative to the sleeve part toward an opposing axial end surface of the sleeve part such that the outer tubular portion of the sheath is longer in the pre-installation configuration than the post-installation configuration; and
wherein in the post-installation configuration the part of the sheath which is adjacent the outer cylindrical surface of the sleeve part has a smaller length than the part of the sheath which is adjacent the inner cylindrical surface of the sleeve part.

15. A blind fastener, comprising:
a bolt part having a shaft and a head;
a sleeve part having an outer cylindrical surface and an inner cylindrical surface, wherein the bolt part is at least partially received within the sleeve part;
a tubular insulating sheath, wherein a first end of the sheath is retained on the bolt part such that relative axial movement between the first end of the sheath and the bolt part is substantially prevented;
wherein the blind fastener is movable between:
a pre-installation configuration in which the sleeve part has a first axial position relative to the bolt part and a predetermined section of the sheath is adjacent the outer cylindrical surface of the sleeve part; and
a post-installation configuration in which the sleeve part has a second different axial position relative to the bolt part and the predetermined section of the sheath is adjacent the inner cylindrical surface of the sleeve part, and
wherein the sheath is folded back around an axial end surface of the sleeve part facing the head of the bolt part such that it forms a folded sheath portion wherein an outer tubular portion of the sheath engages the outer cylindrical surface of the sleeve part and an inner tubular portion of the sheath is disposed between the inner cylindrical surface of the sleeve part and the shaft of the bolt part,
wherein when the sleeve part is threaded onto the bolt part and axially displaced toward the head of the bolt part, the bolt part axially displaces the first fixed end of the sheath relative to the sleeve part toward an opposing axial end surface of the sleeve part such that the outer tubular portion of the sheath is longer in the pre-installation configuration than the post-installation configuration; and
wherein in the post-installation configuration a second end part of the sheath distal from the first end is sandwiched between the sleeve part and a structure on which the blind fastener has been installed such that direct contact between the sleeve part and the structure is prevented by the sheath.

* * * * *